US010772258B2

(12) United States Patent
Sugiyama

(10) Patent No.: US 10,772,258 B2
(45) Date of Patent: Sep. 15, 2020

(54) PORTABLE BRUSH CUTTER

(71) Applicant: YAMABIKO CORPORATION, Ohme-shi, Tokyo (JP)

(72) Inventor: Mikio Sugiyama, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 142 days.

(21) Appl. No.: 15/791,977

(22) Filed: Oct. 24, 2017

(65) Prior Publication Data

US 2018/0116111 A1 May 3, 2018

(30) Foreign Application Priority Data

Oct. 26, 2016 (JP) ................. 2016-209463

(51) Int. Cl.
*A01D 34/90* (2006.01)
*A01D 34/76* (2006.01)
*A01D 101/00* (2006.01)
*F16D 13/14* (2006.01)
*F16D 41/064* (2006.01)
*F16D 43/04* (2006.01)

(52) U.S. Cl.
CPC ........... *A01D 34/905* (2013.01); *A01D 34/90* (2013.01); *A01D 34/76* (2013.01); *A01D 2101/00* (2013.01); *F16D 13/14* (2013.01); *F16D 41/064* (2013.01); *F16D 43/04* (2013.01); *F16D 2300/22* (2013.01)

(58) Field of Classification Search
CPC ...... A01D 34/905; A01D 34/90; A01D 34/76; A01D 34/416; A01D 34/68; A01D 34/6806; A01D 34/6812; A01D 2101/00; F16D 13/14; F16D 41/064; F16D 43/04; F16D 2300/22
USPC .................. 30/276; 56/12.6, 11.3, 11.7, 11.8
See application file for complete search history.

(56) References Cited

U.S. PATENT DOCUMENTS

| 5,774,993 | A * | 7/1998 | Schlessmann | ......... A01G 3/062 30/276 |
| 7,594,334 | B2 * | 9/2009 | Kocha | .................. A01D 34/905 30/276 |
| 8,146,257 | B2 * | 4/2012 | Nishiura | ............... A01D 34/905 30/276 |
| 2002/0078671 | A1 * | 6/2002 | Hiratsuna | .......... A01D 34/6812 56/11.8 |
| 2005/0274021 | A1 * | 12/2005 | Warashina | ........... A01D 34/826 30/76 |
| 2007/0044321 | A1 | 3/2007 | Kocha | |

FOREIGN PATENT DOCUMENTS

JP 2003-88220 A 3/2003
JP 2007-61029 A 3/2007

* cited by examiner

*Primary Examiner* — Phong H Nguyen
(74) *Attorney, Agent, or Firm* — Brinks Gilson & Lione

(57) ABSTRACT

Provided is a portable brush cutter with reduced weight and size due to its simple structure with a small number of components that is capable of improving durability and the like as well as effectively suppressing torsional vibration of a transmission shaft. In the portable brush cutter, a one-way clutch to prevent generation of torsional vibration in a rotation transmission path is interposed between an output shaft and a transmission shaft, and bearings are adjacently mounted on the opposite sides of the one-way clutch.

7 Claims, 3 Drawing Sheets

PORTABLE BRUSH CUTTER

CROSS REFERENCE TO RELATED APPLICATIONS

The present application claims priority from Japanese patent application JP 2016-209463 filed on Oct. 26, 2016, the content of which is hereby incorporated by reference into this application.

BACKGROUND

Technical Field

The present disclosure relates to a portable brush cutter, in particular, a portable brush cutter in which a one-way clutch is disposed in a rotation transmission path through which the rotation of an output shaft of a prime mover is transmitted to a cutting blade.

Background Art

FIG. 3 shows an example of conventional portable brush cutters. A portable brush cutter 1' shown as the conventional example includes a cutting blade operating unit 3 that has a circular saw cutting blade 8 provided rotatably about a rotating shaft 9, a gear box (bevel gear unit) 4, a safety cover 5, and the like, at the front end of an operating rod 2 thereof. The portable brush cutter 1' also has attached thereto, at the rear end of the operating rod 2, an internal combustion engine (an air-cooled small two- or four-stroke cycle gasoline engine) 20 provided with a centrifugal clutch with a recoil starter 21 and a fuel tank 22, the internal combustion engine 20 functioning as a prime mover for driving the cutting blade 8 via a transmission shaft (also referred to as a drive shaft) 7 mounted inside the operating rod 2 and the gear box 4.

Further, a U-shaped handle 10 for moving the cutting blade operating unit 3 from side to side for performing cutting operation is attached to the operating rod 2 at around the center portion thereof, and the U-shaped handle 10 has a left grip 11 and a right grip 12 mounted at the opposite ends thereof.

In the portable brush cutter 1' with such a configuration, due to the fluctuation of combustion of the internal combustion engine 20, changes in the torque and angular speed occur in the rotation of the internal combustion engine 20. Therefore, a relative difference in the rotation is generated between the internal combustion engine 20 and the cutting blade 8 attached to the tip of the elongated transmission shaft 7 (for example, the cutting blade 8 rotates faster than the internal combustion engine 20), thus generating torsional vibration. If such torsional vibration is generated, the elongated transmission shaft 7 is severely shaken in the radial direction, and further, the vibration transmitted via bearings of a clutch drum and the like causes the brush cutter to entirely vibrate.

Further, the torsional vibration of the transmission shaft 7 is transmitted to the hands of the operator via the operating rod 2 and the U-shaped handle 10. Such vibration may not only cause abrasion of components in an early stage, thereby shortening the product life, but also cause deterioration of the operability and an increase in fatigue. Therefore, it is an important issue to prepare a vibration-proof measure to suppress such vibration in the portable brush cutter.

As one of the vibration-proof measures, JP 2007-61029 A, for example, suggests that a torsion coil spring be interposed between the centrifugal clutch and the transmission shaft.

Further, as another vibration-proof measure, JP 2003-88220 A suggests that a one-way clutch be interposed between the centrifugal clutch and the transmission shaft.

SUMMARY

However, although the aforementioned conventional vibration-proof measures that use a torsion coil spring or one-way clutch can provide the vibration-proof effect to some extent, the effect is still insufficient.

For example, when a torsion coil spring is used, the torsion coil spring is elastically deformed (twisted) depending on the twisting direction or the magnitude of twist (angle of torsion) of the transmission shaft, and thus there has been a problem in durability in that the torsion coil spring is easily worn out (that is, the spring force is deteriorated) or broken. There have also been problems such as an increase in the production cost due to an increase in number of components, and an increase in weight due to the complicated and enlarged structure.

Meanwhile, when a one-way clutch is used, as compared to the case when a torsion coil spring is used, the structure is simpler, but the problem in durability still exists in that the one-way clutch is vulnerable to the stress in the radial direction, and thus easily breaks due to radial vibration of the transmission shaft.

Further, in the conventional portable brush cutter described in JP 2003-88220 A above, there has been a difficulty in reducing the weight and size of the portable brush cutter, because, for example, a sleeve member with a spline formed on its inner periphery is pressed into a space between the one-way clutch and the transmission shaft, and thus the number of components is increased so that the structure becomes complicated, and also the sleeve member needs to have some thickness in the portion of the spline on the transmission shaft.

The present disclosure has been made in view of the aforementioned circumstances, and provides a portable brush cutter with reduced weight and size due to its simple structure with a small number of components that is capable of improving durability and the like as well as effectively suppressing torsional vibration of the transmission shaft.

According to an embodiment of the present disclosure, there is provided a portable brush cutter basically including a cutting blade that rotates about a rotating shaft, and a transmission shaft that is positioned between an output shaft of a prime mover and the rotating shaft and couples them together when they are driven. Further, in the portable brush cutter, the rotation of the output shaft of the prime mover is transmitted to the cutting blade via a rotation transmission path, a one-way clutch to prevent generation of torsional vibration in the rotation transmission path is interposed between the output shaft and the transmission shaft or between the rotating shaft and the cutting blade, and bearings are adjacently mounted on the opposite sides of the one-way clutch.

In a preferred aspect, the transmission shaft or the rotating shaft is fit-inserted into and supported by the one-way clutch and the bearings.

In another preferred aspect, the prime mover has a clutch for the prime mover that transmits the rotation of the output shaft to the transmission shaft, the clutch for the prime mover includes a clutch drum provided on the side of the transmission shaft, and the one-way clutch and the bearings are interposed between the clutch drum and the transmission shaft.

In yet another preferred aspect, the clutch drum has a receiver extending forward from the center of its rotation, a rear end of the transmission shaft is received in the receiver, and the one-way clutch and the bearings are fit-inserted and disposed between the receiver and the rear end of the transmission shaft with no clearance.

In another preferred aspect, a portion of the receiver where it couples to the clutch drum is closed.

In yet another preferred aspect, the receiver is made up of a member with a portion where it couples to the clutch drum closed.

In another preferred aspect, a cylindrical guide is disposed adjacent to the bearing provided on the front end side of the one-way clutch.

In a preferred aspect, the rear end of the transmission shaft is provided with a taper portion that tapers toward the rear side.

In another preferred aspect, the one-way clutch and the bearings are configured as a single component.

According to the present disclosure, the torsional vibration of the transmission shaft is suppressed by the one-way clutch disposed in the rotation transmission path, thereby effectively suppressing unpleasant torsional vibration of the transmission shaft transmitted to the hands of the operator. Further, with the bearings adjacently mounted on the opposite sides of the one-way clutch, the radial load on the one-way clutch can be effectively suppressed, and as a result, the one-way clutch does not easily break so that the durability and the like can be improved.

Further, in that case, the transmission shaft or the rotating shaft is directly fit-inserted into the one-way clutch and the bearings, so that the structure is simple with a small number of components, thereby enabling the weight and size of the portable brush cutter to be reduced as compared to conventional ones.

DETAILED DESCRIPTION OF THE PREFERRED EMBODIMENTS

An embodiment of the present disclosure will be described below with reference to the drawings.

Figure 1:
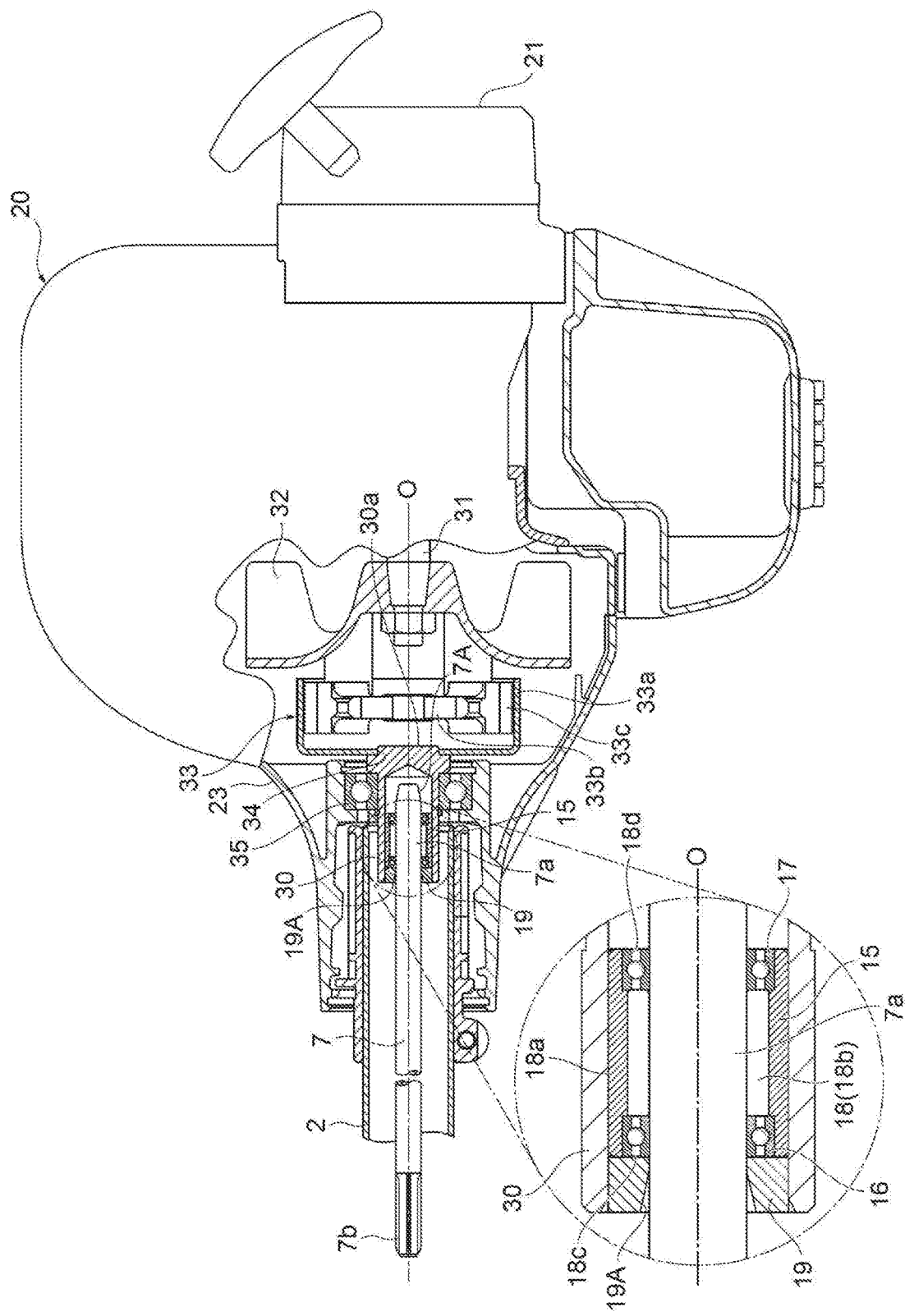
FIG. 1 is a partial cross-sectional view showing the main part of an embodiment of a portable brush cutter according to the present disclosure.
Figure 2:
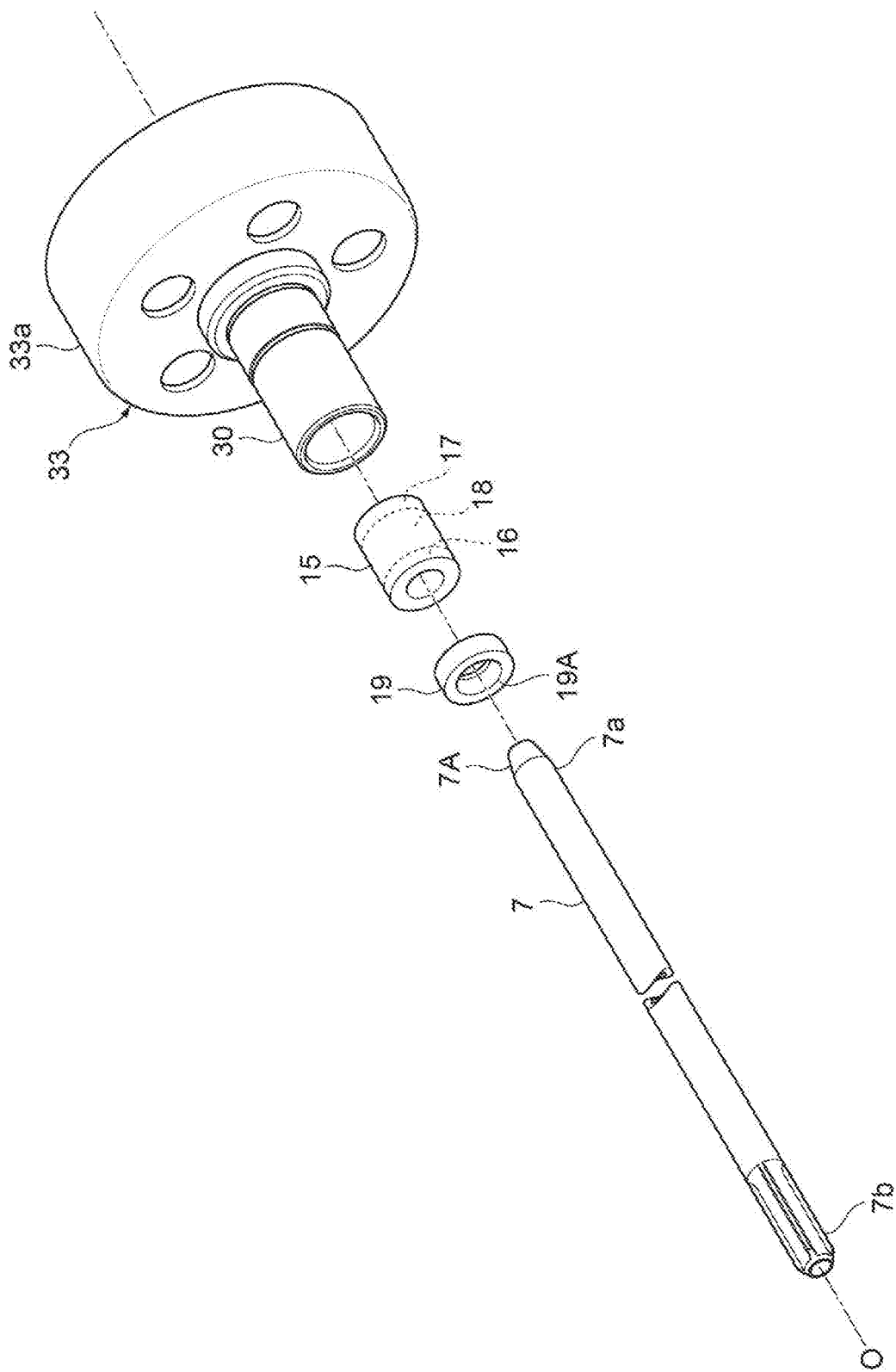
FIG. 2 is an exploded perspective view showing the main part of the portable brush cutter shown in FIG. 1.

FIG. 1 is a partial cross-sectional view showing the main part of an embodiment of a portable brush cutter according to the present disclosure, and FIG. 2 is an exploded perspective view showing the main part of the portable brush cutter shown in FIG. 1.

Figure 3:
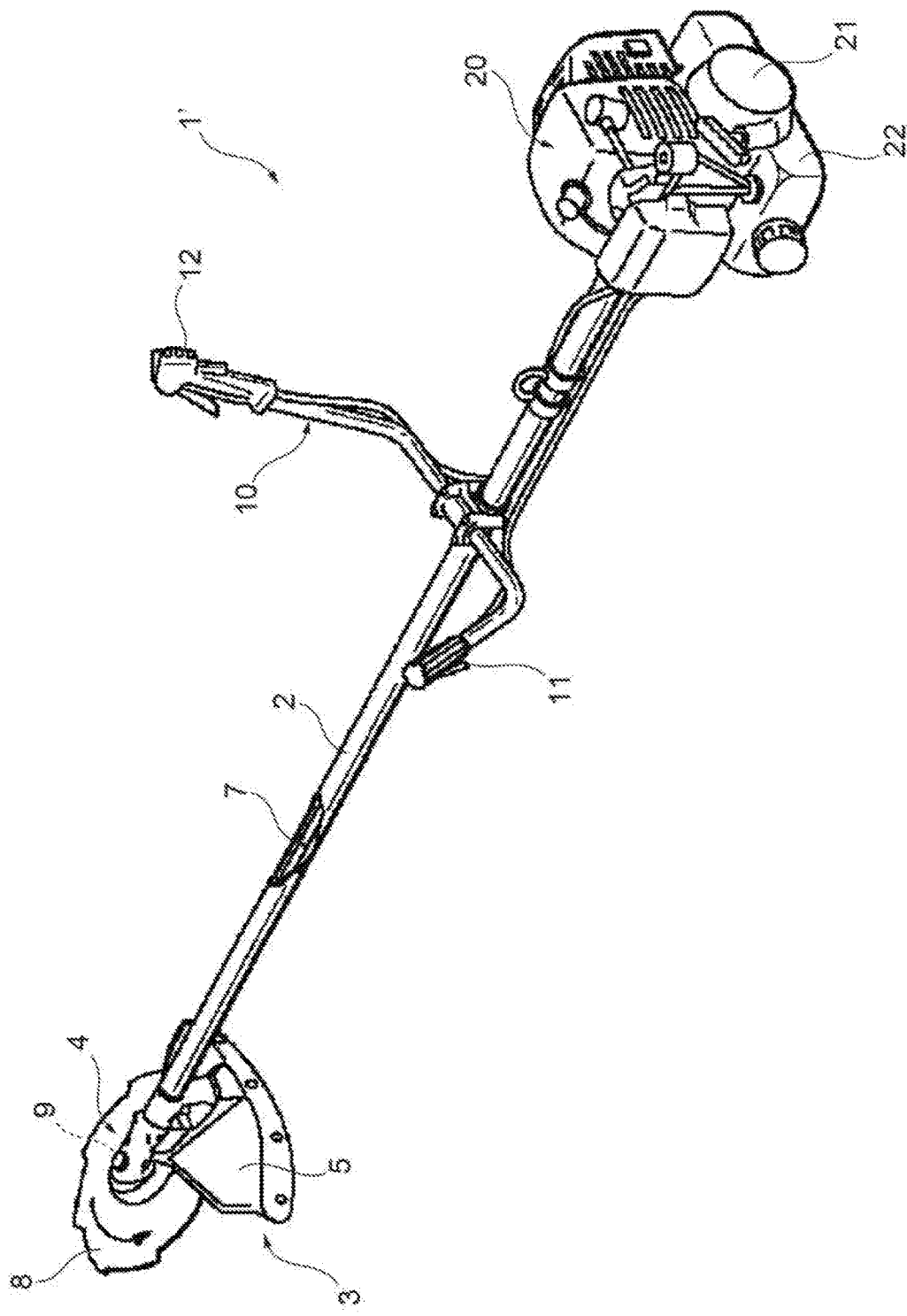
FIG. 3 is a perspective view showing an example of conventional portable brush cutters.

A portable brush cutter 1 of an embodiment shown in the drawings has substantially the same overall configuration as that of the aforementioned portable brush cutter 1' shown in FIG. 3 and includes: a cutting blade operating unit 3 that has a cutting blade 8 provided rotatably about a rotating shaft 9, a gear box 4, and the like, at the front end of an operating rod 2 thereof; an internal combustion engine (air-cooled small two- or four-stroke cycle gasoline engine) 20 provided with a centrifugal clutch 33 for driving the cutting blade 8 via a transmission shaft 7 mounted inside the operating rod 2, and the like, attached thereto at the rear end of the operating rod 2; and a one-way clutch assembly 15 with a one-way clutch 18 in a small roller shape incorporated therein for preventing generation of torsional vibration, the one-way clutch assembly 15 being disposed in a rotation transmission path through which the rotation from an output shaft (also referred to as a crank shaft) 31 of the internal combustion engine 20 is transmitted to the cutting blade 8 that rotates about the rotating shaft 9.

Further, a U-shaped handle 10 with a left grip 11 and a right grip 12 for moving the cutting blade operating unit 3 from side to side for performing cutting operation is attached to the operating rod 2 at around the center portion thereof.

The transmission shaft 7 made of steel mounted inside the operating rod 2 is positioned between the output shaft 31 of the internal combustion engine 20 and the rotating shaft 9 of the cutting blade 8 and couples them together when they are driven. More specifically, a rear end 7a and a front end 7b of the transmission shaft 7 are coupled to the output shaft 31 of the internal combustion engine 20 via the centrifugal clutch 33 and to the rotating shaft 9 of the cutting blade 8 via the gear box 4 and the like, respectively, when they are driven.

Further, in the present embodiment, the one-way clutch assembly 15 that has the one-way clutch 18 for preventing vibration is interposed between the centrifugal clutch 33 and the transmission shaft 7 (the rear end 7a thereof).

More specifically, the centrifugal clutch 33 is coupled to the output shaft 31 of the internal combustion engine 20 via a magnet rotor 32. The centrifugal clutch 33 has a clutch arm 33b that is rotated by the output shaft 31, a clutch shoe 33c provided at the tip end of the clutch arm 33b, and a clutch drum 33a that integrally rotates with the clutch shoe 33c through their frictional engagement.

The clutch drum 33a has a receiver 30 integrally formed therewith, the receiver 30 extending forward from the center of rotation O of the clutch drum 33a and opening toward the transmission shaft 7. The receiver 30 has a bottomed cylindrical shape laid on its side (that is, its rear end is closed), and a cylindrical fitting portion 30a provided at the rear end thereof (the portion where it couples to the clutch drum 33a) is pressed into a center hole 34 provided in the clutch drum 33a so as to be securely coupled thereto. The receiver 30 is rotatably supported via a bearing 35 with respect to a fan cover 23 of the main body that accommodates the internal combustion engine 20, and the front end of the receiver 30 extends to the inside of the operating rod 2 externally mounted on the transmission shaft 7.

It should be noted that in the example shown in the drawings, the receiver 30 is configured as a single component in a bottomed cylindrical shape laid on its side, but the receiver 30 may be formed, for example, such that the rear end thereof (the portion where it couples to the clutch drum 33a) is closed with a lid-like plate or the like.

The cylindrical one-way clutch assembly 15 is pressed into the receiver 30, and the rear end 7a of the transmission shaft 7 is integrally (with no clearance) received in the inside of the one-way clutch assembly 15. That is, the cylindrical one-way clutch assembly 15 is fit-inserted and disposed, with no clearance, between the receiver 30 (the inner periphery thereof) and the rear end 7a of the transmission shaft 7 with a cylindrical cross section received in the receiver 30.

The one-way clutch assembly 15 has bearings integrated therewith such that bearings (for example, ball or needle bearings) 16 and 17 for receiving the radial load are integrally assembled on the opposite sides of the one-way clutch 18 (the front end side that is the side of the cutting blade operating unit 3 and the rear end side that is the opposite side). Specifically, a sintered metallic outer ring 18a (the opposite ends thereof) that holds the one-way clutch 18 extends toward the opposite sides, and an extended portion (opening) 18c on the front end side of the outer ring 18a is provided with the bearing (bearing on the front end side) 16 with a diameter substantially equivalent to that of the one-way clutch 18 and an extended portion (opening) 18d on the rear end side of the outer ring 18a is provided with the bearing (bearing on the rear end side) 17 with a diameter substantially equivalent to that of the one-way clutch 18.

The drawings show a simplified structure of the one-way clutch 18, but the structure will be schematically described below. The one-way clutch 18 includes a cylindrical outer ring 18a with a cam surface formed on its inner peripheral surface; a cylindrical shaft 18b provided inside the outer ring 18a; and a plurality of rollers (not shown) that are interposed between the outer ring 18a and the shaft 18b and that travel on the cam surface. When the outer ring 18a is about to rotate counterclockwise, for example, with respect to the shaft 18b, the rollers move to the positions where they engage with the cam surface of the outer ring 18a so as to transmit the rotation. Meanwhile, when the outer ring 18a is about to rotate clockwise, for example, with respect to the shaft 18b, the shaft 18b relatively rotates counterclockwise with respect to the outer ring 18a, and the rollers move away from the cam surface, so that the outer ring 18a runs idle with respect to the shaft 18b. The rotation of the output shaft 31 is transmitted to the transmission shaft 7 via the one-way clutch 18, but the rotation in the reverse direction is not transmitted.

That is, the transmission shaft 7 (the rear end 7a thereof) received in the receiver 30 is fitted in the one-way clutch 18 of the one-way clutch assembly 15, which is pressed into the receiver 30, so as to be rotatably supported by the bearings 16 and 17 that are adjacently mounted on the opposite sides of the one-way clutch 18.

Further, in the present embodiment, a cylindrical guide 19 made of resin with excellent slidability is pressed into an opening end (front end) of the receiver 30 such that the cylindrical guide 19 abuts (adjoins) the front end surface of the one-way clutch assembly 15, specifically, the front end surface of the bearing 16 provided on the front end side of the one-way clutch 18. The cylindrical guide 19 is formed so as to have a diameter substantially equivalent to that of the one-way clutch assembly 15, and the inner periphery of an opening end of the cylindrical guide 19 is provided with a large-diameter portion 19A for smoothly receiving the transmission shaft 7.

Furthermore, for smoothly inserting the transmission shaft 7 into the cylindrical guide 19 and the one-way clutch assembly 15, the rear end 7a (in particular, a portion to be inserted to a position on a more rear end side than the one-way clutch assembly 15) of the transmission shaft 7 is provided with a taper portion 7A that gradually tapers toward the rear side.

The portable brush cutter 1 with the aforementioned configuration operates as follows.

Specifically, when the internal combustion engine 20 starts operation, the output shaft 31 of the internal combustion engine 20 rotates, the clutch arm 33b is rotated by the rotation of the output shaft 31 and shaken outward with the centrifugal force, so that the clutch shoe 33c provided at the tip end of the clutch arm 33b frictionally engages the inner wall surface of the clutch drum 33a, thereby rotating the clutch drum 33a. The rotation of the clutch drum 33a is transmitted to the transmission shaft 7 via the one-way clutch 18 of the one-way clutch assembly 15 and the rotation of the transmission shaft 7 is transmitted to the cutting blade 8 via the rotating shaft 9, so that the cutting blade 8 is driven to rotate.

Meanwhile, due to the fluctuation of combustion of the internal combustion engine 20, changes in the torque and angular speed occur in the rotation of the internal combustion engine 20, but a relative difference in the rotation between the internal combustion engine 20 and the cutting blade 8 attached to the tip of the elongated transmission shaft 7 is absorbed by the one-way clutch 18 provided at the rear end 7a of the transmission shaft 7, so that the difference in the rotation is not transmitted through the rotation transmission path.

That is, in the portable brush cutter 1 of the present embodiment, the rotation of the output shaft 31 is transmitted to the transmission shaft 7 via the one-way clutch 18 of the one-way clutch assembly 15, and the torsional vibration of the transmission shaft 7 is absorbed by the one-way clutch 18. Further, in that case, the transmission shaft 7 that rotates within the one-way clutch assembly 15 is rotatably supported by the bearings 16 and 17 provided at the opposite ends (the front and rear ends) of the one-way clutch assembly 15.

In the aforementioned manner, in the portable brush cutter 1 of the present embodiment, since the torsional vibration of the transmission shaft 7 is suppressed by the one-way clutch 18 of the one-way clutch assembly 15 that is disposed in the rotation transmission path, unpleasant torsional vibration of the transmission shaft 7 transmitted to the hands of the operator can be effectively suppressed. Further, in the one-way clutch assembly 15, with the bearings 16 and 17 adjacently mounted on the opposite sides of the one-way clutch 18, the radial load on the one-way clutch 18 can be effectively suppressed, and as a result, the one-way clutch 18 does not easily break so that the durability and the like can be improved.

Furthermore, in that case, since the transmission shaft 7 is directly (with no clearance) fit-inserted into and supported by the one-way clutch 18 and the bearings 16 and 17 of the one-way clutch assembly 15, the structure is simple with a small number of components, thereby enabling the weight and size of the portable brush cutter to be reduced as compared to conventional ones in which, for example, a sleeve member with a spline formed thereon is interposed between the one-way clutch and the transmission shaft.

Further, in the present embodiment, the rear end of the receiver 30 for receiving the transmission shaft 7 (the rear end 7a thereof) where it couples to the clutch drum 33a is closed. More specifically, since the receiver 30 is made up of a member with its rear end closed, foreign objects such as dust on the side of the centrifugal clutch 33 do not enter the receiver 30.

In addition, in the present embodiment, a sleeve member such as the one described in JP 2003-88220 A above is not provided between the one-way clutch and the transmission shaft. When such a sleeve member is not used, it is necessary to prepare a special jig for insertion of the transmission shaft into the one-way clutch, and in the brush cutter that needs replacement of the operating rod, the one-way clutch may occasionally be damaged at the time of replacement. To the contrary, in the present embodiment, since the cylindrical guide 19 is disposed adjacent to the bearing 16 provided on the front end side of the one-way clutch 18 of the one-way clutch assembly 15, and the rear end 7a of the transmission shaft 7 to be fit-inserted into the cylindrical guide 19 and the one-way clutch assembly 15 is provided with the taper portion 7A, the rear end 7a of the transmission shaft 7 can be smoothly inserted into and coupled to the one-way clutch assembly 15 that is pressed into the receiver 30 provided in the centrifugal clutch 33, and the one-way clutch 18 of the one-way clutch assembly 15 can also be protected.

It should be noted that in the aforementioned embodiment, the one-way clutch assembly 15 is interposed between the centrifugal clutch 33 and the transmission shaft 7 (the rear end 7a thereof), but the one-way clutch assembly 15 may be attached, for example, in the vicinity of the cutting blade 8, more specifically, between the cutting blade 8 and the rotating shaft 9 for rotating the cutting blade 8 so as to be externally fitted around the rotating shaft 9.

What is claimed is:

1. A portable brush cutter comprising:
   a cutting blade configured for rotation with a rotating shaft;
   a prime mover having an output shaft and operable to generate rotation of the output shaft;
   a transmission shaft positioned between the output shaft of the prime mover and the rotating shaft and configured to transmit rotation of the output shaft of the prime mover to the cutting blade through the rotating shaft; and
   a one-way clutch provided between the output shaft and the transmission shaft, wherein the one-way clutch is configured to restrict relative rotation only in one way between the output shaft and the transmission shaft to thereby transmit rotation in said one way from the output shaft to the transmission shaft, whereas allowing free relative rotation only in the other way between the output shaft and the transmission shaft to prevent transmission of rotation in the other way from the output shaft to the transmission shaft,
   wherein the transmission shaft is fit-inserted into and supported by the one-way clutch,
   wherein the prime mover includes a clutch configured to operably connect the output shaft and the transmission shaft to transmit the rotation of the output shaft to the transmission shaft, the clutch including a clutch drum for receiving rotation of the output shaft, and
   wherein the one-way clutch is configured to operably connect the clutch drum and the transmission shaft.

2. The portable brush cutter according to claim 1, wherein the clutch drum includes a receiver extending forward away from the output shaft from a rotation center of the clutch drum,
   the transmission shaft includes a rear end that is received in the receiver, and
   the one-way clutch is provided between the receiver and the rear end of the transmission shaft with no clearance.

3. The portable brush cutter according to claim 2, wherein the receiver has an open distal end located away from the clutch drum and a closed proximal end coupled to the clutch drum.

4. The portable brush cutter according to claim 3, wherein the receiver comprises a member coupled at the closed proximal end to the clutch drum.

5. The portable brush cutter according to claim 2, further comprising a cylindrical guide disposed in the open distal end of the receiver.

6. The portable brush cutter according to claim 2, wherein the rear end of the transmission shaft is tapered toward the closed proximal end of the receiver.

7. The portable brush cutter according to claim 1, further comprising a set of bearings configured to effect free relative rotation in the other way between the output shaft and the transmission shaft members, wherein the one-way clutch and the bearings are assembled as a single component.

* * * * *